Sept. 20, 1927.

H. J. McCUE

CARBONATOR

Filed Oct. 30, 1922

1,642,739

INVENTOR.

Harry J. McCue

BY
Fay, Oberlin & Fay
ATTORNEYS

Patented Sept. 20, 1927.

1,642,739

UNITED STATES PATENT OFFICE.

HARRY J. McCUE, OF CLEVELAND, OHIO, ASSIGNOR TO THE H. J. McCUE COMPANY, OF CLEVELAND, OHIO, A CORPORATION OF OHIO.

CARBONATOR.

Application filed October 30, 1922. Serial No. 597,824.

The present invention relates to carbonating apparatus, the principal object of the invention being the provision of a simple and inexpensive form of carbonator which may be installed in small beverage dispensing counters or stands in small stores. To the accomplishment of the foregoing and related ends, said invention, then, consists of the means hereinafter fully described and particularly pointed out in the claim.

The annexed drawings and the following description set forth in detail certain mechanism embodying the invention, such disclosed means constituting, however, but one of various mechanical forms in which the principle of the invention may be used.

In said annexed drawings:—

Figure 1:
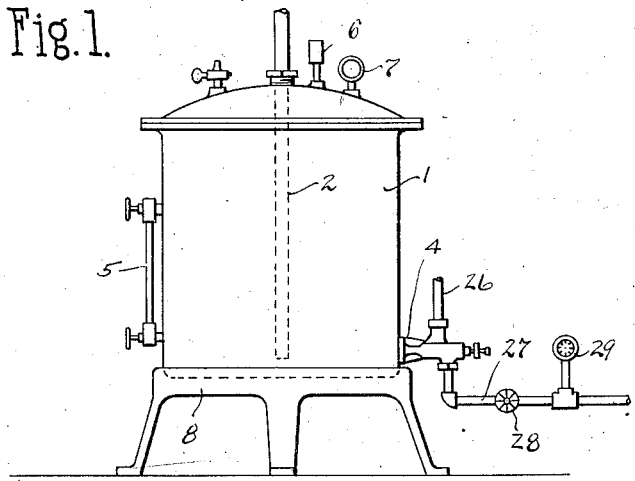
Figure 2:
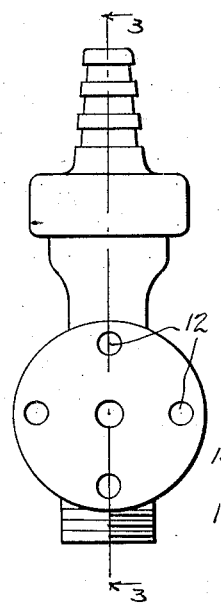

Fig. 1 is a side elevation of my improved carbonating apparatus; Fig. 2 is an end view of the carbonating device proper, and Fig. 3 is a longitudinal section on the line 3—3 in Fig. 2.

In Fig. 1 there is shown a reservoir or tank 1 in which the carbonating liquid is adapted to be confined until drawn off for use. A conduit 2 extends downwardly through the container 1 to a point closely adjacent to the bottom of the same for drawing off the carbonated liquid which is supplied to the reservoir through a carbonating device 4. The tank 1 is provided with a sight glass 5, relief valve 6 and pressure gauge 7, and the tank proper is mounted upon a base member 8 as indicated.

Figure 3:
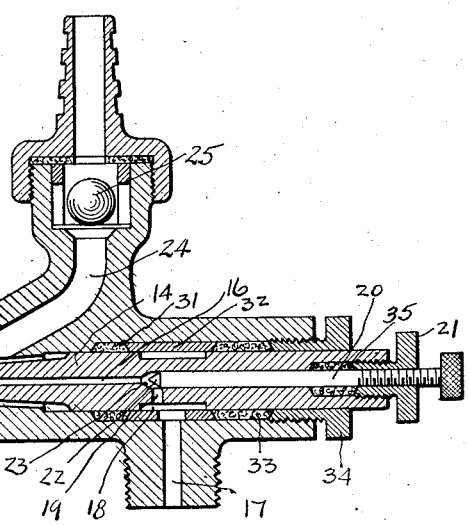

The construction of the carbonating device is shown in Figs. 2 and 3 and consists of a tubular casing or conduit 10 which is provided at one end with a flange 11, having a series of bolt holes 12 for attachment of the conduit to the side of the tank 1 adjacent to the bottom. This device, then, consists of an outer casing or conduit 13 and an inner conduit or nozzle 14 which is mounted concentrically within the outer conduit and terminates at the point 15 adjacent to the discharge end of the conduit 10. The outer conduit 13 is tapered and the outer wall of the inner conduit 14 is also tapered and is spaced from the inner wall of the outer conduit. The inner conduit is formed centrally in a central enlargement or plug 16 which is removably mounted in the outer casing or conduit 10 and is connected with a source of gas supplied through a lateral port 17, recess 18 and port 19. In this way, the gas enters the port 17, close to the inner conduit 14, and discharges from such conduit into the outer conduit 10 at a point adjacent the end of the same. A taper ended screw 20 is adjustably mounted in a cap 21 which is removably fitted into the hollowed-out outer end of the plug 16 for adjusting the flow of gas through the conduit 14. By seating the tapered end 22 of this screw against a conical seat 23 at the inner end of the passage 14, the flow of gas may be entirely cut off.

Liquid is introduced into the conduit 13 around the inner conduit through a port 24, which may be connected to any suitable source of liquid supply. A ball valve 25 is mounted in the port 24 to prevent any return flow of the liquid through this port.

The operation of my apparatus is as follows:—

The port 24 is first connected either to a liquid containing tank or to the water main and the port 17 is connected to a cylinder of carbonic acid gas. The gas flows through the conduit 14 carrying the surrounding water with it and insuring a thorough mixing, and at the beginning, a practical atomizing of the liquid by means of the gas. This mixed gas and water is discharged into the tank 1 until the tank is filled and thereafter additional water and gas discharge into this tank to replace any carbonated liquid that may be drawn off through the pipe 2, which, of course, will be connected to the draft arm at the dispensing counter. Suitable valves may be connected in the pipe lines 26 and 27 leading respectively to the source of water supply and to the source of gas and I have shown the valve 28 in pipe line 27 and also a pressure gauge 29. The plug 16 is sealed tightly into the interior of the casing 10 by means of a packing ring 31, tubular aperture member 32, a second packing ring 33 and a cap 34. By tightening up the cap 34 the packing rings are compressed between the cap and the tube 32 and between the tube and recess wall of the outer conduit 10. In a similar way, a cap 21 serves to compress packing material 35 which is mounted around the screw 20, in this way packing this screw against any leakage of gas.

The present apparatus is relatively inexpensive and simple in its construction and when once installed requires no attention for a considerable period, except for the replacement of the gas containing cylinders when necessary.

Other modes of applying the principle of my invention may be employed instead of the one explained, changes being made as regards the mechanism herein disclosed, provided the means stated by the following claim or the equivalent of such stated means be employed.

I therefore particularly point out and distinctly claim as my invention:—

A carbonating device comprising a tubular casing having a lateral passageway for liquid, a nozzle member having an axial bore, a valve for closing the same, and a lateral passageway adjacent the valve seat, said nozzle member fitting within said casing and being of reduced size forwardly to provide an annular passageway about its forward end to admit said liquid about said liquid about said nozzle, a sleeve, a pair of packing rings slidingly engaged over the rearward end of said nozzle member, a reduced section formed centrally around said nozzle member beneath said sleeve providing an annular passageway with which said lateral passageway in the nozzle member communicates, and a lateral opening formed through said casing and sleeve to communicate with said last named passageway to permit the gas to flow through said nozzle and means for forcing said packing rings into fluid-tight relation between said casing and said nozzle member and said intermediate sleeve to permit easy assemblage and to prevent leakage.

Signed by me this 24th day of October, 1922.

HARRY J. McCUE.